United States Patent
Sahi et al.

(10) Patent No.: US 10,220,886 B2
(45) Date of Patent: Mar. 5, 2019

(54) COMPENSATOR ASSEMBLY FOR A VEHICLE FRAME

(71) Applicant: Ford Global Technologies, LLC, Dearborn, MI (US)

(72) Inventors: Jaspinder S. Sahi, Novi, MI (US); John T. Reed, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 407 days.

(21) Appl. No.: 15/043,770

(22) Filed: Feb. 15, 2016

(65) Prior Publication Data

US 2016/0159410 A1 Jun. 9, 2016

Related U.S. Application Data

(63) Continuation of application No. 14/252,205, filed on Apr. 14, 2014, now Pat. No. 9,302,716.

(51) Int. Cl.
*B62D 27/06* (2006.01)
*F16B 5/02* (2006.01)
(Continued)

(52) U.S. Cl.
CPC ........... *B62D 27/065* (2013.01); *B62D 25/06* (2013.01); *F16B 5/025* (2013.01); *F16B 5/0233* (2013.01);
(Continued)

(58) Field of Classification Search
CPC ...... F16B 5/0233; F16B 5/025; F16B 37/043; F16B 5/0635; F16B 37/005; F16B 37/02; F16B 37/041; F16B 37/044; Y10T 29/49826; Y10T 29/49947; Y10T 29/49963; B62D 27/065; B62D 25/06
(Continued)

(56) References Cited

U.S. PATENT DOCUMENTS 4,729,705 A * 3/1988 Higgins ............... F16B 5/01
411/174
5,288,191 A 2/1994 Rückert et al.
(Continued)

FOREIGN PATENT DOCUMENTS

CN 102825997 12/2012
DE 3644492 7/1987
(Continued)

OTHER PUBLICATIONS

Britcar (UK) Ltd., "BYH000010—CLIP—Retaining Sunroof Motor G-Cat." http://www.brit-car.co.uk/product.php/110707/5497/clip_retaining_sunroof_motor_g_cat. Oct. 25, 2013. 2 pages printed.

*Primary Examiner* — Sarang Afzali
*Assistant Examiner* — Darrell C. Ford
(74) *Attorney, Agent, or Firm* — Jason Rogers; Price Heneveld LLP

(57) ABSTRACT

A compensator assembly for a vehicle frame includes a base member having a clip engaging a first frame component spaced from a second frame component. An extension member is threadably coupled with the base member. A fastener extends coaxially through the base and the extension members to engage the first and second frame components. Rotation of the fastener unthreads the extension member until it contacts the second frame component.

16 Claims, 9 Drawing Sheets

(51) Int. Cl.
*F16B 5/06* (2006.01)
*F16B 37/00* (2006.01)
*F16B 37/02* (2006.01)
*F16B 37/04* (2006.01)
*B62D 25/06* (2006.01)

(52) U.S. Cl.
CPC .......... *F16B 5/0635* (2013.01); *F16B 37/005* (2013.01); *F16B 37/02* (2013.01); *F16B 37/041* (2013.01); *F16B 37/044* (2013.01)

(58) Field of Classification Search
USPC ......... 29/428, 525.01, 525.11; 411/174, 175, 411/546
See application file for complete search history.

(56) References Cited

U.S. PATENT DOCUMENTS

| | | | | |
|---|---|---|---|---|
| 6,357,953 | B1* | 3/2002 | Ballantyne | F16B 5/0233 403/365 |
| 6,669,422 | B1* | 12/2003 | Sterle | F16B 5/0233 411/178 |
| 6,776,566 | B2 | 8/2004 | Kobusch et al. | |
| 7,155,953 | B1* | 1/2007 | Nikkel | B21J 15/046 29/243.526 |
| 7,207,762 | B2* | 4/2007 | Teal | F16B 37/065 16/2.1 |
| 7,488,135 | B2* | 2/2009 | Hasegawa | F16B 5/0233 403/167 |
| 7,591,403 | B2 | 9/2009 | Binder et al. | |
| 8,202,033 | B2* | 6/2012 | Choi | B62D 25/147 411/535 |
| 8,459,703 | B2* | 6/2013 | Anderson | E05B 63/0056 292/194 |
| 9,187,045 | B2* | 11/2015 | Bittner | B60R 9/04 |
| 2007/0224018 | A1* | 9/2007 | DePerro | F16B 37/043 411/175 |
| 2008/0247842 | A1* | 10/2008 | Motsch | F16B 37/02 411/174 |
| 2011/0311331 | A1* | 12/2011 | Tejero Salinero | F16B 37/02 411/175 |
| 2015/0117976 | A1* | 4/2015 | Erb | F16B 37/042 411/174 |
| 2018/0237077 | A1* | 8/2018 | Bednarek | B29C 44/1242 |
| 2018/0265139 | A1* | 9/2018 | Asai | B62D 25/145 |

FOREIGN PATENT DOCUMENTS

| | | |
|---|---|---|
| DE | 19753646 | 6/1998 |
| DE | 10063649 | 7/2002 |
| EP | 2174836 | 1/2012 |
| KR | 20050014154 | 2/2005 |
| KR | 100828616 | 5/2008 |
| KR | 20080109184 | 12/2008 |
| WO | 2013060572 | 5/2013 |

* cited by examiner

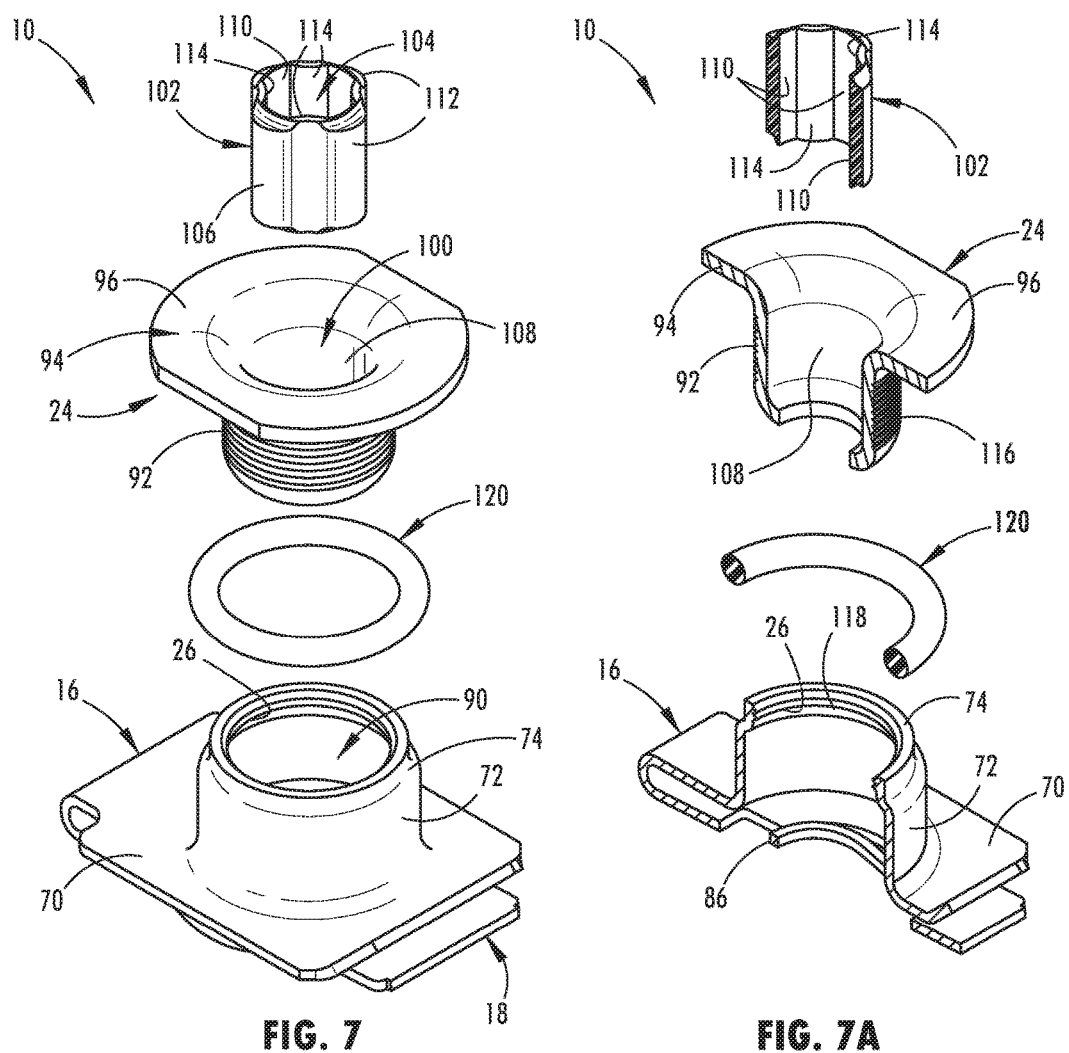
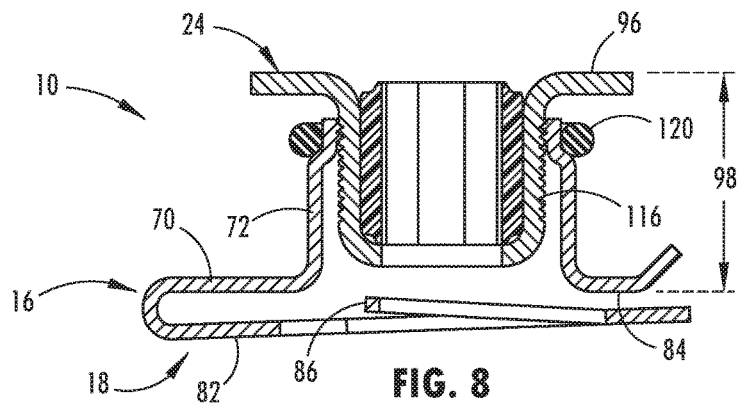
FIG. 7 FIG. 7A
FIG. 8

COMPENSATOR ASSEMBLY FOR A VEHICLE FRAME

CROSS-REFERENCE TO RELATED APPLICATION

The present application is a continuation of U.S. patent application Ser. No. 14/252,205 filed Apr. 14, 2014, entitled COMPENSATOR ASSEMBLY FOR A VEHICLE FRAME, now U.S. Pat. No. 9,302,716, the entire disclosure of which is hereby incorporated herein by reference.

FIELD OF THE INVENTION

The present invention generally relates to a compensator assembly for a vehicle frame, and particularly relates to a compensator assembly that is capable of extending and securing between spaced apart frame components.

BACKGROUND OF THE INVENTION

It is generally understood that the manufacture and assembly of vehicle frames may result in production variance, such that frame components may have various spacings and specific dimensions that are inconsistent. To accommodate such variances, it is common to weld spacers or bend connection brackets between frame components. It is desired for vehicle frames to be assembled with fewer inconsistencies and to utilize lighter weight materials that maintain the structural integrity of the vehicle.

SUMMARY OF THE INVENTION

According to one aspect of the present invention, a compensator assembly for a vehicle frame includes a base member having a clip engaging a first frame component spaced from a second frame component. An extension member is threadably coupled with the base member. A fastener extends coaxially through the base and the extension members to engage the first and second frame components. Rotation of the fastener unthreads the extension member until it contacts the second frame component.

According to another aspect of the present invention, a compensator assembly for spanning between first and second frame components includes a base member having a clip for engaging the first frame component. An extension member is threadably coupled with the base member. A sleeve is retained in the extension member and has an aperture extending through the base and the extension members for receiving a fastener. Rotation of the fastener unthreads the extension member away from the clip into contact with the second frame component.

According to yet another aspect of the present invention, a compensator assembly for supporting a gap between a frame component and a moonroof structure includes a base member having a threaded portion and a clip for engaging the frame component. An extension member is rotatably coupled with threaded portion and is configured to retain a fastener within an aperture coaxial with the threaded portion. Rotation of the fastener unthreads the extension member into abutment with the moonroof structure.

According to another aspect of the present invention, a method for supporting a gap between first and second frame components includes engaging a base member of a compensator assembly to the first frame component proximate an attachment aperture. The method also provides inserting a fastener through the attachment aperture and into engagement with an extension member that is threadably coupled with the base member. Further, the method provides rotating the fastener, which unthreads the extension member away from the base member until it contacts the second frame component. The method then provides further rotating the fastener after the extension member is abutting the second frame component, causing the fastener to engage between the first and second frame components.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is an exploded top perspective view of the compensator assembly shown in FIG. 3;

FIG. 7A is a cross-sectional view of the exploded top perspective view of the compensator assembly shown in FIG. 7;

FIG. 8 is a cross-sectional view of the compensator assembly, taken at line VIII-VIII of FIG. 4;

DETAILED DESCRIPTION OF THE PREFERRED EMBODIMENTS

Figure 1:
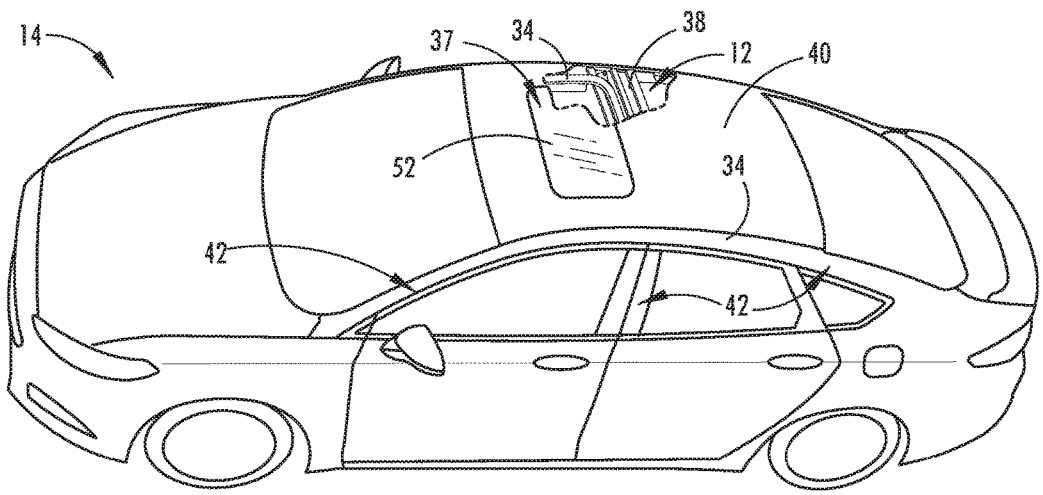
FIG. 1 is a top perspective view of a vehicle having a moonroof structure spaced from a frame component of the vehicle frame.

For purposes of description herein, the terms "upper," "lower," "right," "left," "rear," "front," "vertical," "horizontal," and derivatives thereof shall relate to the embodiment of the vehicle as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-11, reference numeral 10 generally designates a compensator assembly for a frame 12 of a vehicle 14. In the illustrated embodiment, the compensator assembly 10 is configured to couple between spaced components of the vehicle frame 12. A base member 16 of the compensator assembly 10 has a clip 18 that engages a first frame component 20 that is spaced from a second frame component 22. An extension member 24 is threadably coupled with the base member 16 or otherwise rotatably coupled with a threaded portion 26 of the base member 16. A fastener 28 may extend coaxially through the base and extension members 16, 24 to engage the first and second frame components 20, 22. The compensator assembly 10 is configured such that the initial insertion and rotation of the fastener 28 may unthread the extension member 24 until it contacts the second frame component 22, thereby supporting a gap 30 between the first and second frame components 20, 22. The first and second frame components 20, 22 may be various portions of the vehicle frame 12; however, in the illustrated embodiment the first frame component 20 comprises a bracket 32 extending from a roof rail 34 of the vehicle frame 12 and the second frame component 22 comprises a moonroof structure 36.

Referring now to FIG. 1, the illustrated embodiment of the vehicle 14 is shown with an area of the vehicle frame 12 exposed to illustrate one of the roof rails 34 extending longitudinally on opposing sides of a moonroof assembly 37. A cross member 38 is also partially illustrated, which spans laterally between the roof rails 34 to support the moonroof assembly 37 and other portions of the roof 40. In the illustrated embodiment, the roof rails 34 are supported by pillars 42 that extend upward around an interior cabin of the vehicle 14, as generally understood by one having ordinary skill in the art. The roof rails 34, cross members 38, pillars 42, moonroof assembly 37, and roof 40 are all illustrated examples of frame components of the vehicle 14, although additional frame components are also contemplated for incorporating a compensator assembly 10 as described herein. It is also conceivable that the compensator assembly 10 may be incorporated in vehicle frames of alternative types of vehicles, such as a truck, a sport utility vehicle, or a van, that may have alternative frame components or roof configurations, as generally understood by one having ordinary skill in the art.

Figure 2:
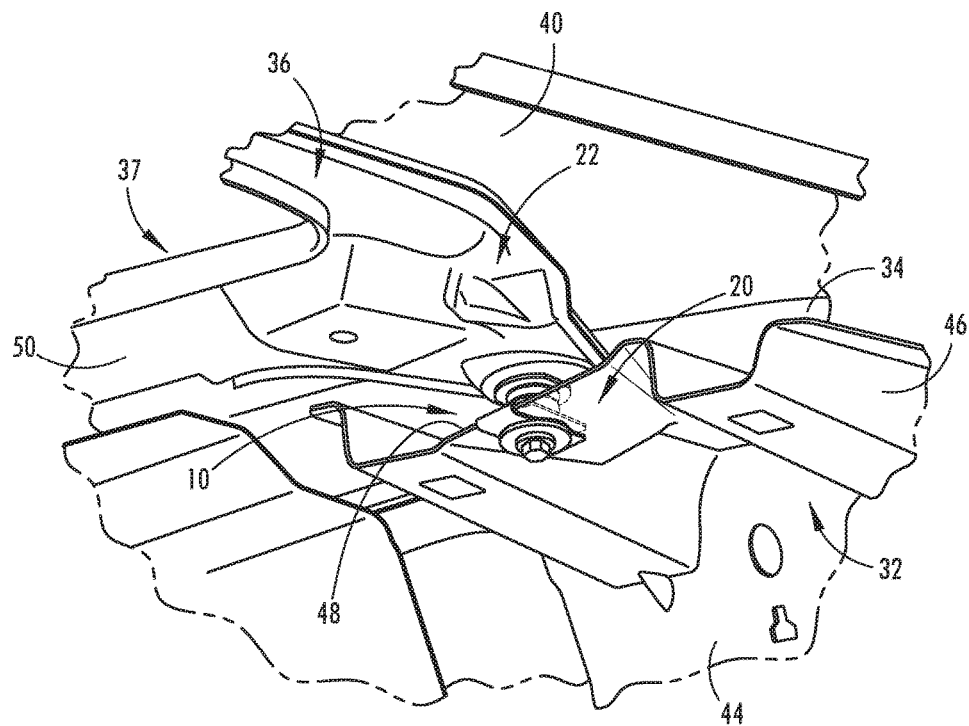
FIG. 2 is a bottom perspective view of a compensator assembly according to one embodiment of the present invention, which is illustrated supporting a gap between a frame component and the moonroof structure, as shown in FIG. 1.

As illustrated in FIG. 2, the roof rail 34 includes the bracket 32 extending laterally inward proximate a B-pillar of the vehicle frame 12. The bracket 32 in the illustrated embodiment is formed with sheet metal to have a substantially vertical portion 44 that attaches with the roof rail 34 and a substantially horizontal portion 46 that is configured with a generally planar body having a mounting surface 48 for attaching the moonroof assembly 37. The moonroof assembly 37 in the illustrated embodiment includes a structural portion 50, commonly referred to as a ring reinforcement, that surrounds a glass portion 52 (FIG. 1) of the moonroof assembly 37. The structural portion 50 in the illustrated embodiment has a support flange 54 that protrudes laterally from the glass portion 52 and downward for engaging the bracket 32. The support flange 54 has an attachment location that generally aligns in vertical orientation with the mounting surface 48 of the bracket 32, defining a gap 30 between the bracket 32 and the structural portion 50 of the moonroof assembly 37. It is appreciated that the gap 30 may vary in size across a plurality of vehicle frames that are manufactured for the same type of vehicle. It is also contemplated that the gap 30 may vary at different locations between the moonroof assembly 37 and the bracket 32 or between other vehicle frame components that are fastened to one another, which may be accommodated with a compensator assembly 10 according to additional embodiments of the present invention.

Figure 2A:
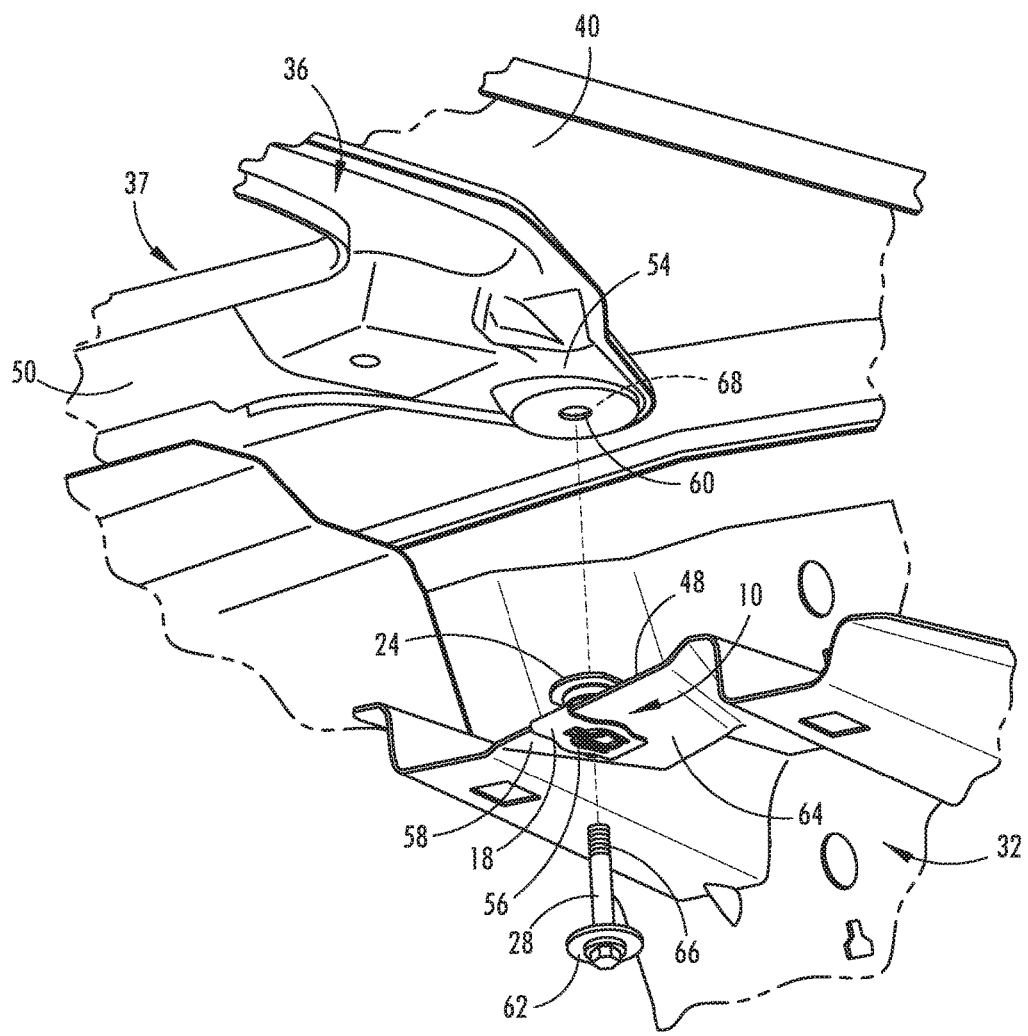
FIG. 2A is an exploded bottom perspective view of the compensator assembly shown in FIG. 2, having a fastener disengaged and the frame component exploded away from the moonroof structure.
Figure 2B:
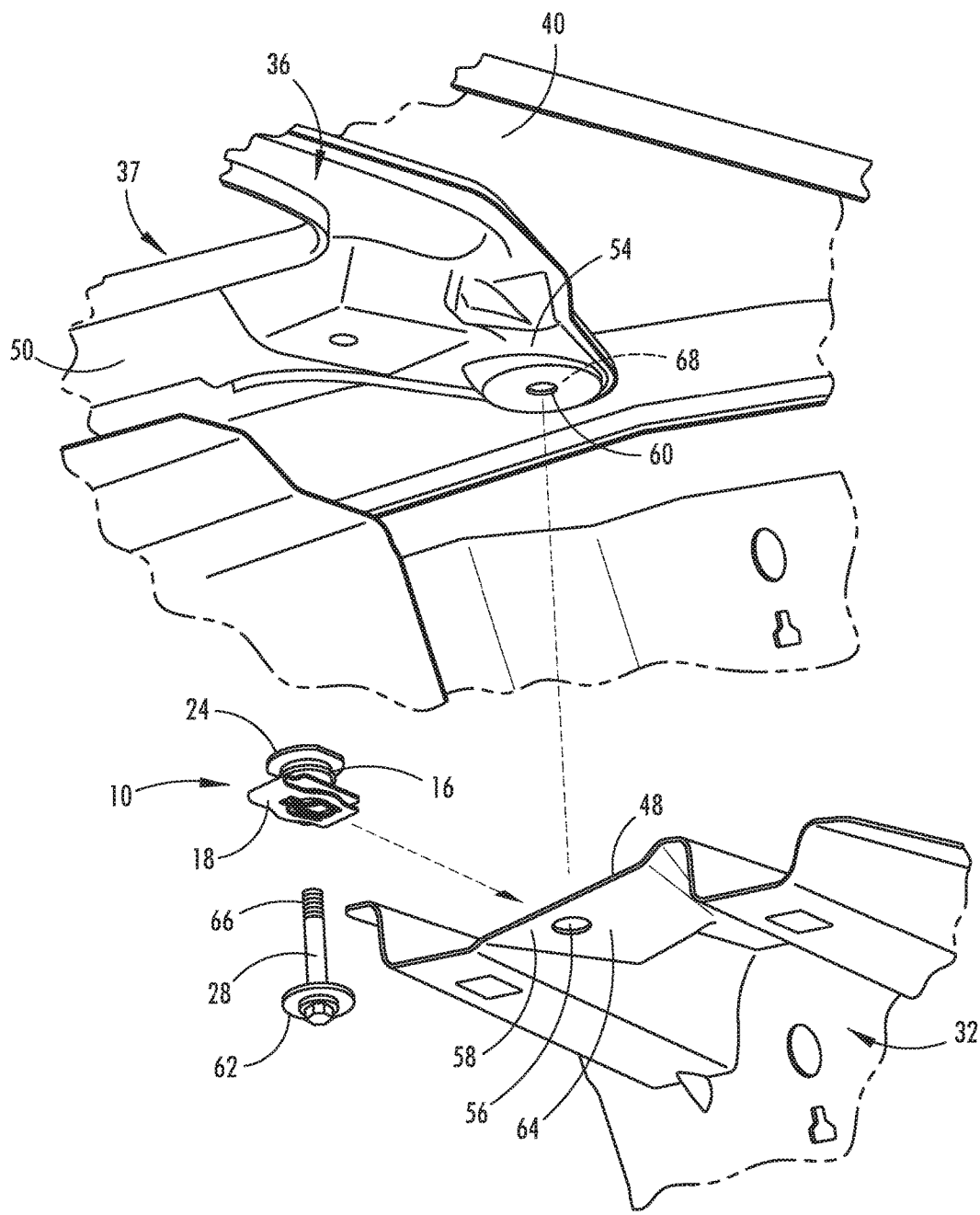
FIG. 2B is an exploded bottom perspective view of the compensator assembly shown in FIG. 2, having a base member of the compensator assembly disengaged from the frame component.
Figures 3, 4:
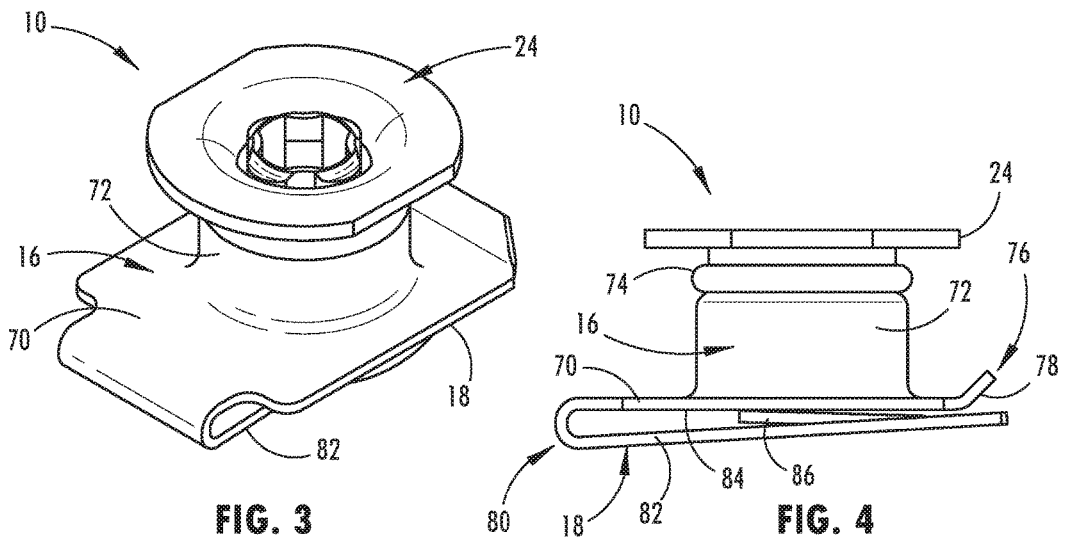
FIG. 3 is a top perspective view of a compensator assembly according to one embodiment of the present invention.
FIG. 4 is a side elevation view of the compensator assembly shown in FIG. 3.

As shown in FIGS. 2A-2B, the mounting surface 48 on the bracket 32 includes an attachment aperture 56 extending vertically through the generally planar body of the bracket 32. The attachment aperture 56 is located proximate an edge 58 of the bracket 32, such that the clip 18 on the base member 16 of the compensator assembly 10 may engage the edge 58 of the bracket 32 to align with the attachment aperture 56. The support flange 54 extending from the structural portion 50 of the moonroof assembly 37 has a corresponding connection aperture 60 in substantially vertical alignment with the attachment aperture 56 through the bracket 32. Such alignment allows the fastener 28 to extend through the base member 16 and the extension member 24 of the compensator assembly 10 and engage between the bracket 32 and the structural portion 50 of the moonroof assembly 37. In the illustrated embodiment, a head 62 of the fastener 28 has a greater diameter than the attachment aperture 56 for retaining the head 62 against a bottom surface 64 of the bracket 32 and also allowing a threaded shaft portion 66 of the fastener 28 to engage a nut 68 or other threaded member fixed to or otherwise integrally formed with the structural portion 50 of the moonroof assembly 37 in coaxial alignment with the corresponding connection aperture 60.

Referring now to FIGS. 3-6, the base member 16 of the illustrated embodiment includes a substantially planar platform section 70 with a barrel section 72 protruding upward from a central area of the platform section 70. The barrel section 72 includes a generally cylindrical shape that is bordered proximate the top end of the barrel section 72 with an inset diameter, defining a narrow portion 74. An exterior-facing end 76 of the platform section 70 is angled upward to provide a ramped surface 78 for engaging the edge 58 of the bracket 32. An opposing interior-facing end 80 of the platform section 70 includes a primary retention member 82 of the clip 18 that integrally spans beneath the platform section 70 in general alignment therewith. The primary retention member 82 is slightly angled and thereby biased toward a bottom surface 84 of the platform section 70. A secondary retention member 86 extends inward from the distal end of the primary retention member 82, proximate the exterior-facing end 76 of the platform section 70, extending toward the interior-facing end 80 and angled further toward the bottom surface 84 of the platform section 70 to provide an additional bias. The primary retention member 82 has a central opening 88 formed in alignment with the attachment aperture 56 and an opening 90 that extends coaxially through the barrel section 72 of the base member 16. Similarly, the secondary retention member 86 partially boarders the opening 90, defining a generally horseshoe shape.

Figure 5:
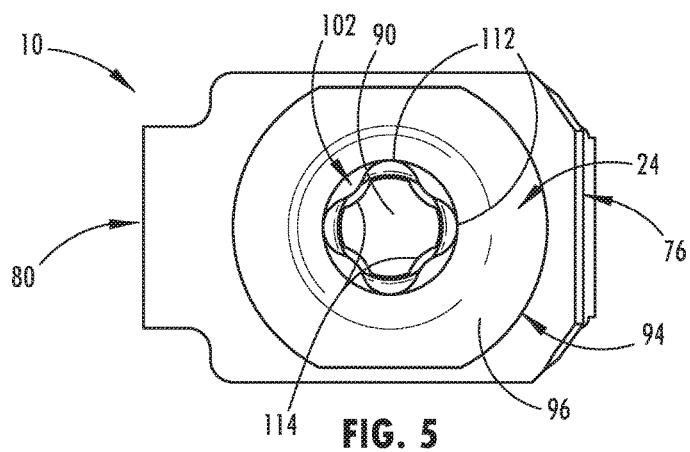
FIG. 5 is a top plan view of the compensator assembly shown in FIG. 3.
Figure 6:
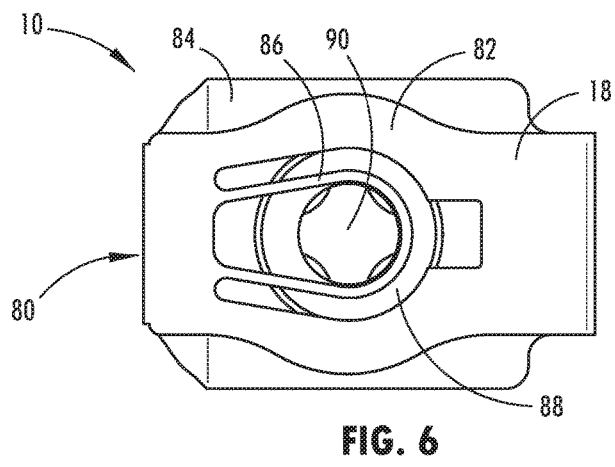
FIG. 6 is a bottom plan view of the compensator assembly shown in FIG. 3.

With general reference to FIGS. 5-7, the extension member 24 of the illustrated embodiment has a lower portion 92 with a generally cylindrical shape that is sized to fit in coaxial alignment within the opening 90 through the barrel section 72 of the base member 16. An upper portion 94 of the extension member 24 includes an abutment surface 96 in substantially horizontal alignment with the bottom surface of the base member 16, whereby a length 98 (FIG. 8) of the compensator assembly 10 is defined between the abutment surface 96 of the extension member 24 and the bottom surface of the base member 16. A cavity 100 is formed downward from the abutment surface 96 into the extension member 24 and has a generally cylindrical shape in coaxial alignment with the lower portion 92 of the extension member 24. A sleeve 102 is retained in the cavity 100 of the extension member 24 that has an aperture 104 that extends through the base member 16 and the extension member 24 for receiving the fastener 28. The sleeve 102, in the illustrated embodiment, has a tubular shape with an outer surface 106 that is configured to frictionally engage an interior surface 108 of the cavity 100 and has an inner surface 110 configured to frictionally engage the threaded shaft of the fastener 28 (FIG. 2B). More specifically, the sleeve 102 has four rounded protrusions 112 that extend vertically along the outer surface 106 thereof. Between the rounded protrusions 112 on the outer surface 106 of the sleeve 102, corresponding protrusions 114 extend radially inward from the inner surface 110 of the sleeve 102, as shown in FIG. 5. It is contemplated that the sleeve 102 may be formed with various shapes and alternatively spaced protrusions, and in one embodiment may be formed from a polymer material. It is also conceivable in additional embodiments that the sleeve 102 may be formed of elastomeric materials including rubber, synthetic elastomers, composites, and other conceivable materials configured to frictionally engage both the extension member 24 and the fastener 28 with a sufficient coefficient of friction, as further defined herein. Furthermore, it is contemplated that the sleeve 102 may be retained in the cavity 100 with adhesive or may engage the fastener 28 with adhesive or other bonding material in additional embodiments.

As also illustrated in FIGS. 7A-8, an exterior surface 116 of the lower portion 92 of the extension member 24 is threaded for threadably engaging the threaded portion 26 of the base member 16. More specifically, the threaded portion 26 of the base member 16 in the illustrated embodiment is contained on an inside surface 118 of the base member 16 proximate the upper end thereof. Specifically, the threaded portion 26 in the illustrated embodiment is contained on the narrow portion 74 of the base member 16 that has an inset diameter. An O-ring 120, is also provided in the illustrated embodiment between the upper end of the base member 16 and the extension member 24 to maintain the threaded engagement between the threaded portion 26 of the base member 16 and the exterior surface 116 of the lower portion 92 of the extension member 24. It is also understood that the O-ring 120 may omitted in additional embodiments or otherwise incorporated into the base member 16 and/or the extension member 24.

Figure 9:
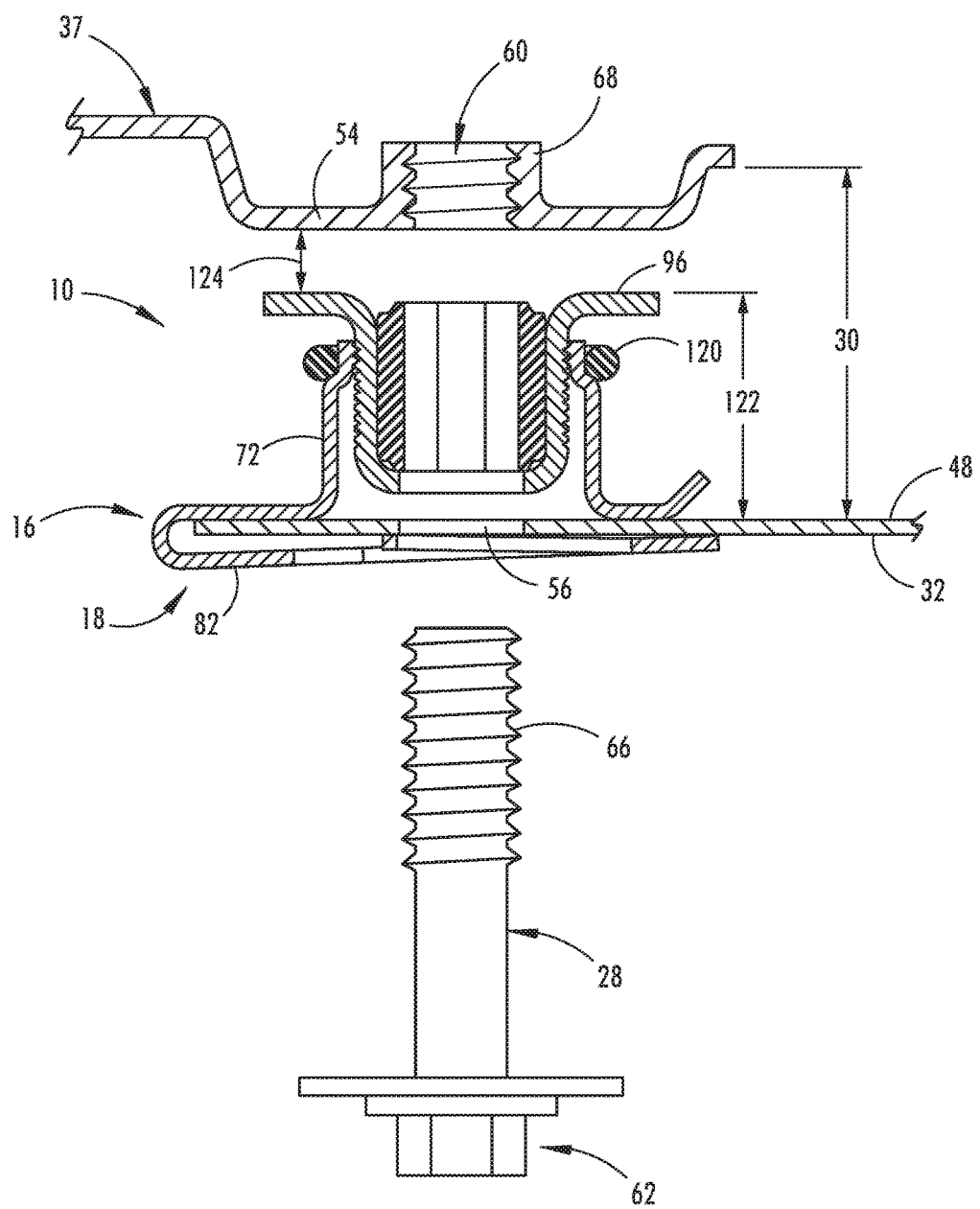
FIG. 9 is a cross-sectional view of the compensator assembly shown in FIG. 8 engaged to a first frame component that is spaced from a second frame component with the compensator assembly positioned at an installation length, according to one embodiment of the present invention.

Referring now to FIG. 9, the clip 18 on the base member 16 shown engaged with the edge 58 of the bracket 32 and aligning the attachment aperture 56 in the bracket 32 with the aperture that extends through the sleeve 102 and the base and extension members 24. The gap 30 between the bracket 32 and the structural portion 50 of the moonroof assembly 37 is further defined between the mounting surface 48 and the lower surface of the structural portion 50. It is understood that the gap 30 in the illustrated embodiment is defied after the vehicle frame 12 is assembled, or at least substantially assembled, and when the moonroof assembly 37 is subsequently installed to the vehicle frame 12. Although, it is contemplated that the gap 30 may be alternatively defined with a partially assembled vehicle frame 12 in additional embodiments. In the illustrated embodiment, the compensator assembly 10 is shown with the base member 16 and the extension member 24 at an installation length 122, which leaves a spacing 124 between the abutment surface 96 of the extension member 24 and the moonroof assembly 37. The compensator assembly 10 is configured to extend from the installation length 122 to fill the spacing 124 and thereby support the gap 30. It is appreciated that the compensator is further configured to accommodate varied spacing that assembly 10 may result from inconsistency in frame 12 manufacturing. As also shown in the embodiment illustrated in FIG. 9, the primary and secondary retention members 82, 86 of the clip 18 are biased against the bracket 32 to retain the bottom surface 84 of the base member 16 in engaged and abutting contact with the mounting surface 48 of the bracket 32.

Figure 10:
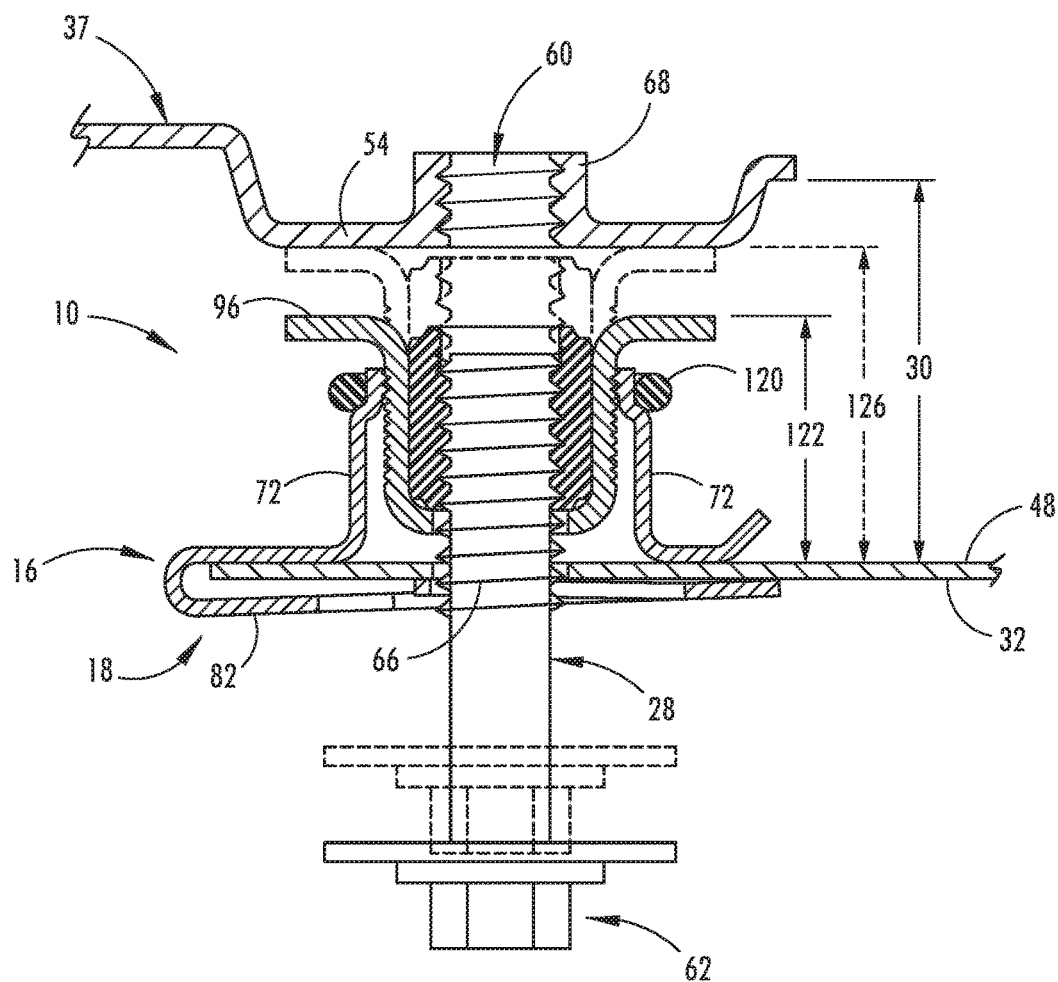
FIG. 10 is a cross-sectional view of the compensator assembly shown in FIG. 9, having a fastener engaged with an extension member that is moved into contact with the second frame component.

In operation of the illustrated embodiments of the compensator assembly 10, as shown in FIG. 10, the fastener 28 is inserted into the aperture 104 through the bracket 32 and into engagement with the sleeve 102. Thereafter, the fastener 28 is rotated, such that the extension member 24 is threaded away from the base member 16. As such, the base member 16 remains generally fixed relative to the bracket 32, allowing the rotation of the fastener 28 to rotate the extension member 24 relative to the base member 16. More specifically, the threaded shaft portion 66 of the fastener 28 frictionally engages the sleeve 102, which also is frictionally retained against the interior surface 108 of the cavity 100 within the extension member 24. A first coefficient of friction between the sleeve 102 and the fastener 28 is greater than a second coefficient of friction between the threaded portion 26 of the base member 16 and the extension member 24. As such, in the illustrated embodiment, the fastener 28 is not permitted to extend beyond the extension member 24 until the extension member 24 contacts the moonroof assembly 37. Accordingly, rotation of the fastener 28 does not overcome the first coefficient of friction until the extension member 24 abuts the moonroof assembly 37, prohibiting further extension of the extension member 24 from the base member 16 and thereby prohibiting further rotation between the extension member 24 and the base member 16.

Figure 11:
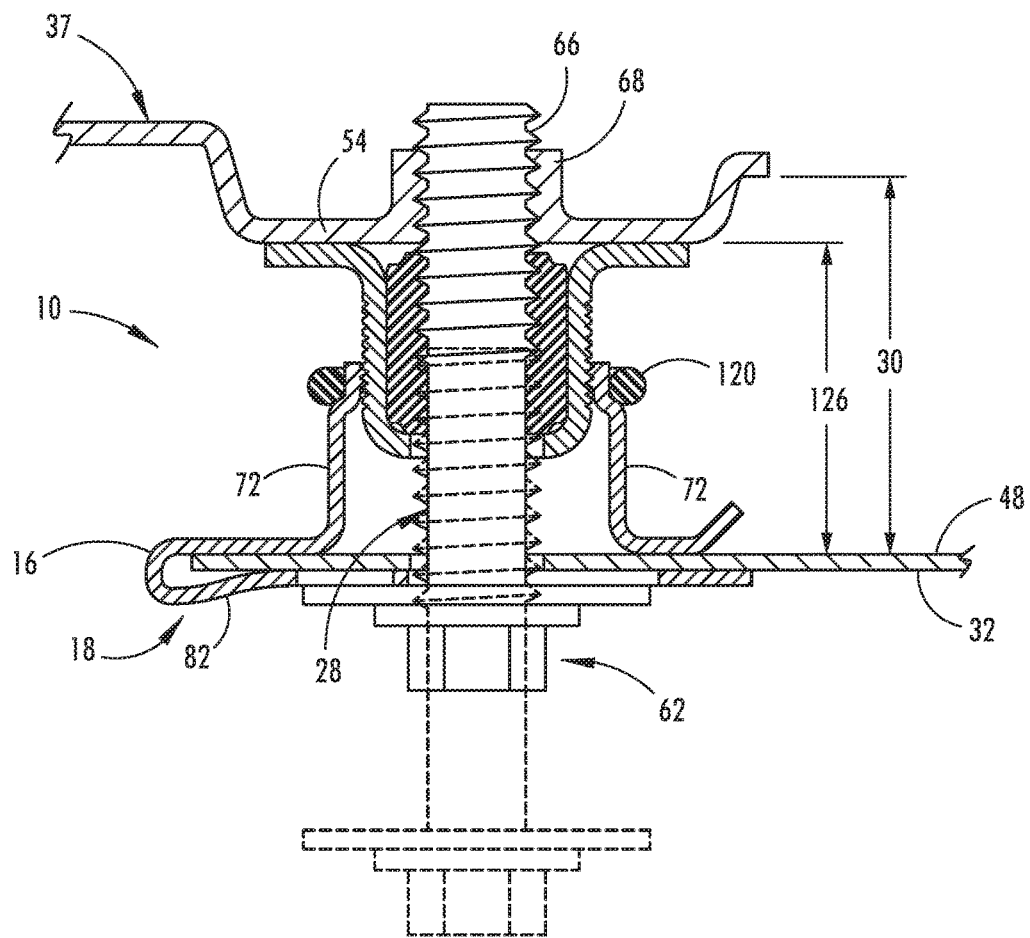
FIG. 11 is a cross-sectional view of the compensator assembly shown in FIG. 9, having the fastener engaged between the first and second frame components with the compensator assembly extended to a deployed length.

As illustrated in FIG. 11, the base member 16 and the extension member 24 are in a deployed length 126, according to one embodiment, supporting the gap 30 between the bracket 32 and the moonroof assembly 37. Once in the deployed length 126, further rotation of the fastener 28 overcomes the first coefficient of friction causing the fastener 28 to thread beyond the sleeve 102 and threadably engage the moonroof assembly 37. More specifically, the threaded portion 26 of the fastener 28 engages the nut 68 fixed with the support flange 54 of the moonroof assembly 37, according to the illustrated embodiment. Accordingly, the head 62 of the fastener 28 secures against the bracket 32, whereby the primary and secondary retention members 82, 86 of the clip 18 are secured between the head 62 of the fastener 28 and the bracket 32. Tightening of the fastener 28 generates a compression force between the moonroof assembly 37 and the bracket 32, which is opposed by the deployed length 126 of the compensator assembly 10 to provide a secure and substantially rigid connection.

Figure 12:
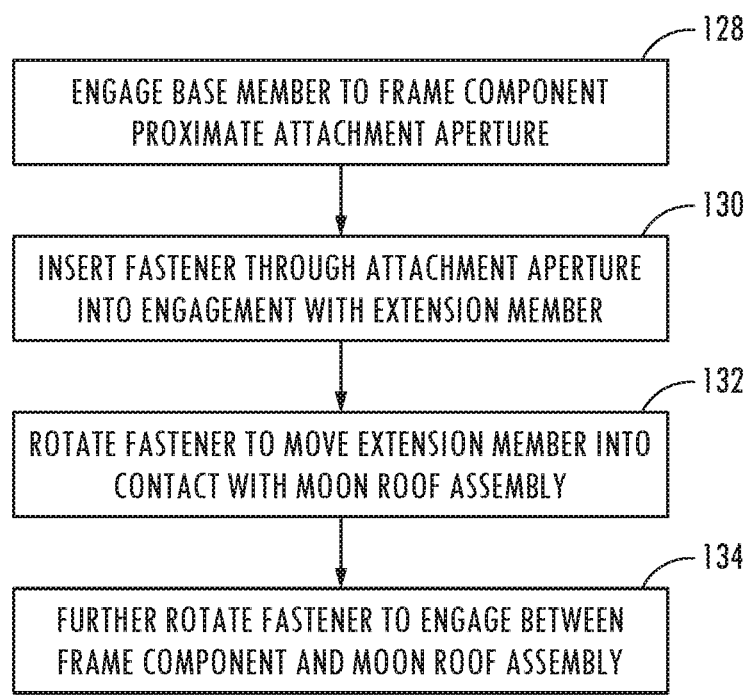
FIG. 12 is a flow chart of a method for support a gap between a frame component and a moonroof structure.

With reference to FIG. 12, a method for supporting a gap 30 between first and second frame components 20, 22 using a compensator assembly 10 of the present invention is illustrated according to one embodiment and further described as follows. Initially, at step 128, a base member 16 of the compensator assembly 10 is engaged to the first frame component 20 proximate an attachment aperture 56. More specifically, a clip 18 on the base member 16 may slidably engage an edge 58 of the first frame component 20. At step 130, the method then provides inserting a fastener 28 through the attachment aperture 56 and into engagement with an extension member 24 that is threadably coupled with the base member 16. The fastener 28 may be frictionally retained to the extension member 24 by an intermediate sleeve 102 frictionally retained therebetween. Further, at step 132, the method provides rotating the fastener 28, which unthreads the extension member 24 away from the base member 16 until it contacts the second frame component 22. At step 134, the method then provides further rotating the fastener 28 after the extension member 24 is abutting the second frame component 22, causing the fastener 28 to engage between the first and second frame components 20, 22.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for supporting a gap in a vehicle frame, the method comprising steps of:
   engaging a base member of a compensator assembly to a first frame component proximate an attachment aperture;
   inserting a fastener through the attachment aperture and into engagement with an extension member threadably coupled with the base member;
   rotating the fastener which threadably separates the extension member away from the base member until the extension member contacts a second frame component; and
   rotating the fastener after the extension member is abutting the second frame component, causing the fastener to engage between the first and second frame components and support the gap defined therebetween, wherein a sleeve is retained in the extension member for frictionally retaining the fastener until the extension member contacts the second frame component, the sleeve including inner and outer surfaces and a first set of vertically oriented protrusions that extends inward from the inner surface of the sleeve and a second set of vertically oriented protrusions that extend outward from the outer surface of the sleeve, wherein the engagement between the first set of vertically oriented protrusions of the sleeve and the fastener defines a first coefficient of friction.

2. The method of claim 1, wherein the step of engaging the base member to the first frame component includes attaching a clip of the base member to the first frame component.

3. The method of claim 2, wherein the clip has a retention member biased toward a bottom surface of the base member, whereby the clip is configured to engage an edge of the first frame component between the retention member and the bottom surface of the base member.

4. The method of claim 3, wherein the retention member includes primary and secondary retention members that are each biased toward the bottom surface of the base member.

5. The method of claim 4, wherein the secondary retention member defines an opening extending through the base member, wherein the opening receives the fastener.

6. The method of claim 1, wherein the first frame component comprises a bracket extending from a roof rail of the vehicle frame and the second frame component comprises a moonroof structure, and wherein the vehicle frame is assembled prior to attachment of the moonroof structure.

7. The method of claim 1, wherein the extension member includes a portion that interfaces with the fastener and has a first coefficient of friction that is greater than a second coefficient of friction between opposing threads on the base member and the extension member.

8. The method of claim 1, wherein the first coefficient of friction between the first set of vertically oriented protrusions of the sleeve and the fastener is greater than a second coefficient of friction between the base member and the extension member, such that the fastener overcomes the first coefficient of friction when the extension member contacts the second frame component.

9. A method for installing a vehicle moonroof comprising steps of:
  disposing a base member of a compensator assembly proximate an attachment aperture of a roof-rail bracket;
  disposing a support flange of a moonroof assembly proximate the bracket to define a gap; and
  threading a fastener through the base member and attachment aperture to threadably operate an extension member of the compensator assembly toward and into engagement with the support flange to maintain the gap, wherein a sleeve includes inner and outer surfaces and a first set of vertically oriented protrusions that extends inward from the inner surface of the sleeve and a second set of vertically oriented protrusions that extend outward from the outer surface of the sleeve, and wherein the sleeve is retained in the extension member for frictionally retaining the fastener until the extension member contracts the support flange, wherein the engagement between the first set of vertically oriented protrusions of the sleeve and the fastener defines a first coefficient of friction.

10. The method of claim 9, further comprising a step of:
  rotating the fastener after the extension member is abutting the support flange, causing the fastener to engage between the bracket and the support flange and support the gap defined therebetween.

11. The method of claim 9, wherein the fastener extends coaxially through the base member, extension member and attachment aperture to engage the bracket and the support flange.

12. The method of claim 9, wherein the first coefficient of friction between the sleeve and the fastener is greater than a second coefficient of friction between the base member and the extension member, such that the fastener overcomes the first coefficient of friction when the extension member contacts the support flange.

13. The method of claim 9, wherein the base member is disposed proximate an edge of the bracket.

14. The method of claim 9, wherein the step of disposing the base member proximate an attachment aperture includes attaching a clip of the base member to the bracket, wherein the clip includes a retention member biased toward a bottom surface of the base member, whereby the clip is configured to engage an edge of the bracket between the retention member and the bottom surface of the base member.

15. A method for supporting a gap between a frame component and a moonroof structure comprising steps of:
  disposing a base member on the frame component, wherein an extension member is threadably engaged with the base member;
  disposing the moonroof structure over the extension member to define the gap; and
  rotationally threading a fastener through the base member, wherein rotation of the fastener threadably extends the extension member into abutment with the moonroof structure, wherein,
    a sleeve having a tubular shape is retained in a cavity of the extension member in coaxial alignment with an aperture defined within the base and extension members, wherein the sleeve is adapted to frictionally retain the fastener to the extension member until the extension member contacts the moonroof structure; and
    the sleeve includes a first plurality of vertically oriented protrusions that extend vertically along an inner surface of the sleeve and a second plurality of vertically oriented protrusions that extend vertically along an outer surface of the sleeve, wherein engagement of the fastener with the first plurality of protrusions along the inner surface of the sleeve at least partially defines a first coefficient of friction.

16. The method of claim 15, wherein the first coefficient of friction between the first plurality of vertically oriented protrusions of the sleeve and the fastener is greater than a second coefficient of friction between a threaded portion of the base and the extension member, such that the fastener overcomes the first coefficient of friction when the extension member contacts the moonroof structure.

* * * * *